April 23, 1963  R. R. BOWER  3,086,681
ARTICLE HANDLING
Filed Sept. 5, 1961  4 Sheets-Sheet 2

FIG. 2

INVENTOR.
RICHARD R. BOWER
BY Christie, Parker & Hale
ATTORNEYS.

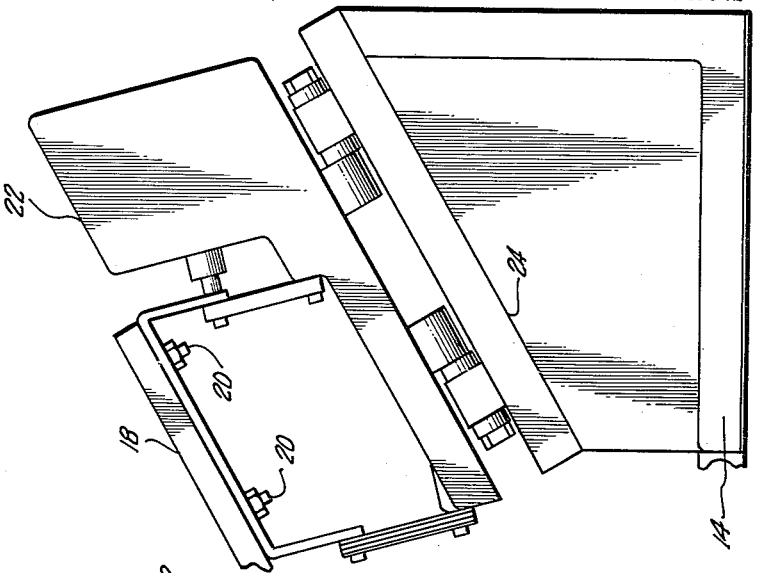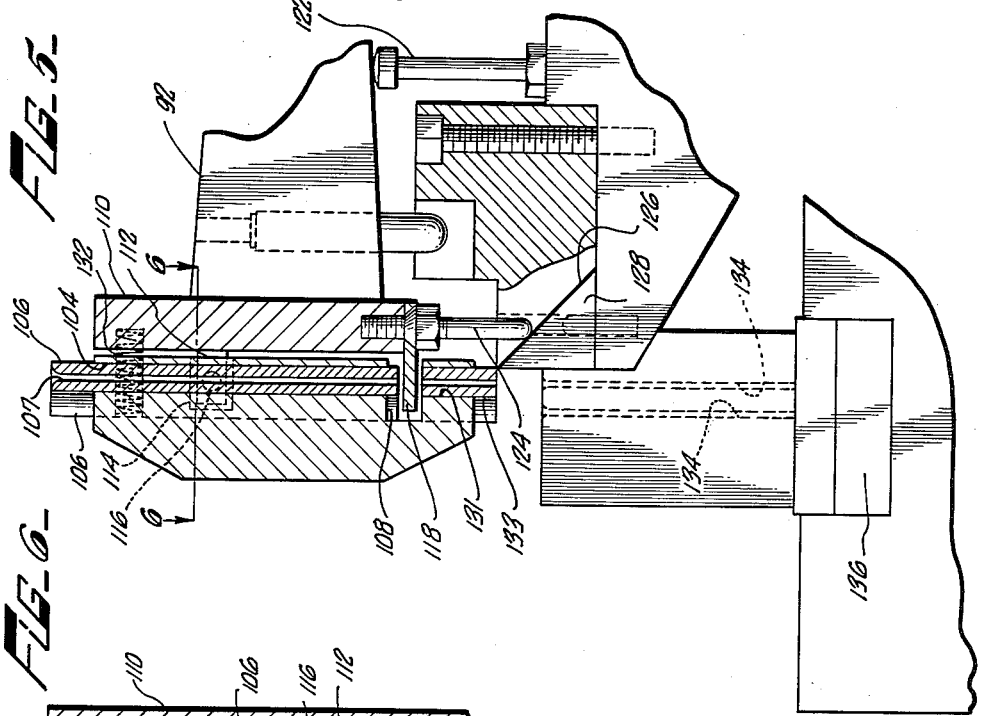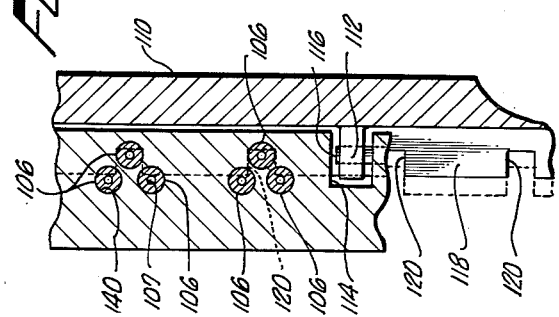

April 23, 1963

R. R. BOWER 3,086,681

ARTICLE HANDLING

Filed Sept. 5, 1961

INVENTOR.
RICHARD R. BOWER
BY
Christie, Parker & Hall
ATTORNEYS.

United States Patent Office 3,086,681
Patented Apr. 23, 1963

3,086,681
ARTICLE HANDLING
Richard R. Bower, Palo Alto, Calif., assignor, by mesne assignments, to Raytheon Company, Lexington, Mass., a corporation of Delaware
Filed Sept. 5, 1961, Ser. No. 135,878
13 Claims. (Cl. 221—2)

This invention relates to the automatic selection and positioning of elongated parts, such as wires, from a loose batch of the parts.

Although the invention is useful in many types of operations, it finds particular application in the automatic assembly of wire electrodes for transistors, and is specifically described below with respect to that use.

One of the operations in the assembly of transistors requires the placement of relatively long and small diameter wires into correspondingly small diameter holes in a carbon boat. The wires are ordinarily available in loose batches, and it is a tedious, time-consuming job to select the wires and insert them manually in the proper positions.

This invention provides apparatus that automatically selects individual wires from a loose batch of the wires and moves the selected wires to a loading position where they can automatically be moved into a new and desired position. In the preferred form, the apparatus selects a plurality of separate individual wires simultaneously, and moves them to new respective positions for automatic simultaneous loading into the desired location.

Briefly, the apparatus includes means for holding a loose batch of elongated parts or wires disposed on their sides. Means are provided for moving a selected one of the parts from the batch to a loading position. A movable head having an elongated opening through it is mounted adjacent the loading position to be pivotable between a first position and a second position. When the head is in the first position, the opening through it is collinear with a selected part in the loading position. When the head is in the second position, the opening is disposed in a direction transverse to that in which it extends in the first position. Means are provided for moving the selected part longitudinally into the opening when the head is in the first position, and means are provided for pivoting the head to the second position when the part is in the opening so the part is shifted from the loading position to a new position in which the longitudinal axis of the part extends transverse to the axis of the part in the loading position.

In the preferred form, means are provided for gripping one end of a selected part and lifting it up through other parts in the batch to the loading position. Stop means are also included on the head to limit the travel of the part into the head opening when the head is in the first position. Means are also provided for automatically actuating the stop means and releasing the part when the head is in the second position so the part can slide from the head opening. The preferred form of the apparatus also includes an elongated pusher pin disposed collinearly with the head opening when the head is in the second position, and means are provided for moving the pusher pin longitudinally into the opening to displace the part from the opening in the head.

These and other aspects of the invention will be more fully understood from the following detailed description and the accompanying drawings in which:

FIG. 2 is a fragmentary plan view, partly broken away, taken on the staggered line 2—2 of FIG. 1;

FIG. 3 is a fragmentary side elevation of a vibrator used with the apparatus shown in FIGS. 1 and 2;

FIG. 5 is an enlarged fragmentary sectional view of the movable head; and

FIG. 6 is a fragmentary view, partly broken away, taken on line 6—6 of FIG. 5.

Figure 1:
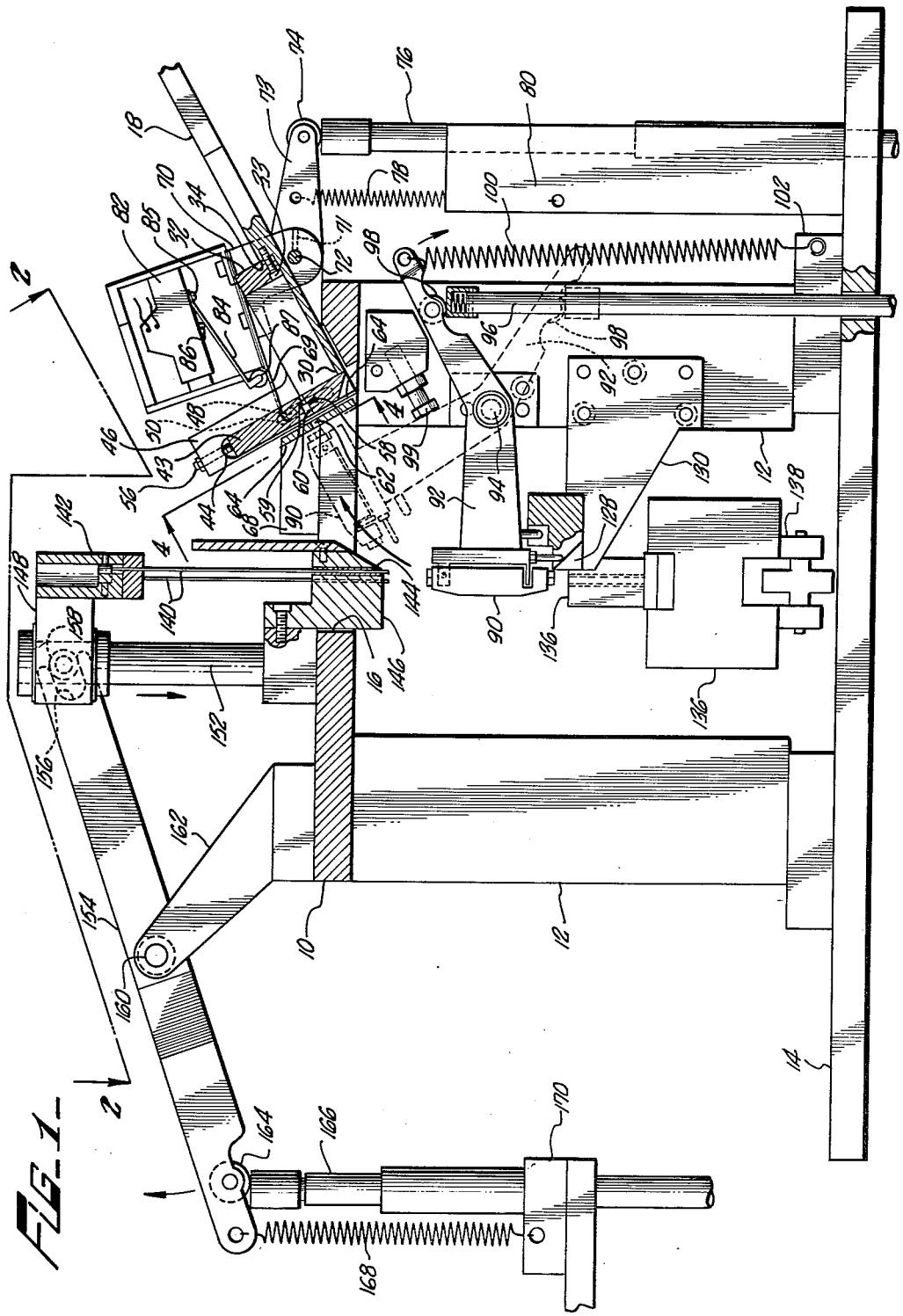
FIG. 1 is a fragmentary sectional view of the presently preferred form of the apparatus.

Referring to FIGS. 1 and 2, a horizontal table 10 rests on four upright supports 12 mounted on a horizontal platform 14. The table includes a rearwardly facing U-shaped opening 16 into which extends an inclined vibrator plate 18 attached at its rear end by bolts 20 to a conventional vibrator 22 mounted on an inclined support 24 resting on the table 14.

The forward edge of the vibrator plate 18 is of reduced thickness to form a hopper bottom 30. A hopper back plate 32 is secured by screws 33 to a transverse shoulder 34 formed where the vibrator plate is stepped down to reduced thickness. Hopper side plates 36 are secured to the right and left edges (top and bottom, respectively, as viewed in FIG. 2) of the forward portion of the vibrator plate to form the sides of a hopper 38, which is divided into hopper sections 40 by longitudinally extending hopper dividers 42. An elongated elevator plate 43 is mounted across the forward end of the hopper dividers to make an up-and-down sliding fit against them and the forward ends of the side plates. The ends of the elevator plate each make a sliding fit in respective inwardly opening grooves 44 in the forward ends of elevator plate guides 46 mounted on the outside of each hopper side plate.

A separate horizontal pin 48 extends outwardly from each end of the elevator plate and through an upright slot 50 in the lower portion of each respective elevator guide. A separate upright tension spring 52 is connected at its lower end to a respective elevator plate pin 48 and at its upper end to a pin 54 mounted on the upper portion of an elevator plate guide. Springs 52 urge the elevator plate 43 upwardly against separate adjustable stop screws 56 threaded down through the top of a respective elevator plate guide and extending into the upper portion of a respective groove 44.

The elevator plate has thirty holes extending through it. The holes are arranged in ten sets of three holes 58 each, with a set of three holes for each hopper division. As shown best in FIG. 1, each hole 58 includes a relatively small bore portion 59 opening into a hopper division, and a large bore portion 60 opening out of the forward face of the elevator plate and disposed collinearly with a corresponding bore 62 through a transverse plate 64 mounted by screws 66 on blocks 68 across the U-shaped opening 16 in the table 10.

The elevator plate is forced down against the action of springs 52 by a pair of leaf spring 69. The forward end of each leaf spring is disposed over a respective elevator plate pin 48, and the rear end of each leaf spring is secured to a respective block 70 secured by a set screw 71 on a horizontal rotatable shaft 72 journaled at its left end in the table and having its right end journaled through the table. A crank arm 73 is rigidly secured to the right end of the shaft 72 and carries a follower roller 74 which rides on the upper end of a vertical push rod 76 that extends down through the platform and is moved up and down by hand or preferably by suitable conventional means (not shown), such as a cam on a cam shaft. A vertical tension spring 78 is connected at its upper end to the crank arm 73 and at its lower end to a block 80 mounted on the platform 14. The spring 78 urges the shaft 72 to rotate in a clockwise direction (as viewed in FIG. 1) so that when the elevator plate 43 is pulled by springs 52 to its uppermost position against the stops 56, the leaf springs are spaced a slight distance above the elevated plate pins 48. This permits the vibrator plate to be vibrated with minimum damping due to contact from the leaf springs 69.

A microswitch 82 is mounted on the block 70 adjacent the left end of the shaft 72 and rotates with the shaft. A microswitch arm 84 is secured by a screw 85 to the underside of the microswitch and extends under a contact button 86 on the microswitch. The lower end of the microswitch arm 84 carries a roller 87 which rides on the forward portion of the leaf spring 69 connected to the block 70. If for some reason the elevator plate should be jammed so that it cannot be forced down, the leaf spring 69 is deflected upwardly relative to the microswitch, and causes the microswitch arm 84 to move up and actuate the contact button 86, which in turn develops a suitable signal to warn of improper operation of the machine. For example, the signal can be used to ring a bell or cut off the main power (not shown) so the operation of the machine is stopped.

A plurality of elongated parts, say wires (not shown), are disposed in each of the hopper divisions with their longitudinal axes extending in the same general direction as the hopper dividers 42. The wires are slightly shorter than the hopper dividers, and are stacked on their sides on each other in the bottom of the hopper. The wires tend to slide forward (to the left as viewed in FIG. 1) and rest against the rear face of the elevator plate 43.

An elongated horizontal head 90 is disposed under the table, and is secured to the forward ends of a pair of laterally spaced head arms 92 which are each mounted by separate respective horizontal pivot pins 94 on the inside of a respective rear post 12. The rear end of the right head arm extends upwardly and rearwardly from its pivot pin over a vertical push rod 96, which extends down through the platform and is moved up and down by a suitable cam (not shown) mounted on the cam shaft. Alternatively, the rod 96 may be moved up and down by hand. A rotatable follower wheel 98 is mounted adjacent the rear end of the head arm 92 over the upper end of the push rod 96, and is urged down against the rod by a vertical tension spring 100 secured at its upper end to the rear end of the head arm 92 and at its lower end to a block 102 mounted on a platform 14. Thus, as the pushrod 96 is moved up and down, the head moves from a first position shown in dotted lines in FIG. 1 down to a second position shown in solid lines.

As shown best in FIG. 2, the movable head includes thirty vertical (when the head is in the solid line position) holes 104 arranged in ten groups of three each so that each hole 104 is collinear with a corresponding hole 62 in the stationary plate when the head is pivoted up to the first or dotted line position shown in FIG. 1.

As shown best in FIG. 5, a separate guide sleeve 106 is press-fitted in each vertical bore 104 through the head, and the upper end of each guide sleeve 106 is flared outwardly to facilitate the entry of a wire into it.

The lower portion of the rear face of the head includes a horizontal and rearwardly opening groove 108 that extends under the lower end of each hole 104 and sleeve 106. A stop plate 110 is held adjacent the rear face of the head by a pair of ears 112 which extend forwardly into respective notches 114 in the rear face of the head and are secured to the head by horizontal transverse pivot pins 116.

The lower edge of the stop plate 110 carries a shelf 118 which extends forwardly into the groove 108 in the head. As shown best in FIG. 6, the forward edge of the shelf 118 includes a plurality of forwardly opening notches 120. Each notch is under a group of three vertical holes 104 in the head. With the head in the down position shown in FIG. 5, i.e., resting on a vertical stop 122 (FIG. 5), a vertical release pin 124 attached to the lower edge of the stop plate engages a downwardly and rearwardly inclined surface 126 on a block 128 secured to a forwardly extending bracket 130 mounted on a rear post 12. The inclined surface 126 forces the plate 110 to pivot in a counter-clockwise direction (as viewed in FIG. 5) and move the shelf to the solid line position shown in FIG. 6, so the shelf is moved out from under each of the longitudinal bores 107 in the thirty guide sleeves 106 mounted in the bores 104. When the head is lifted toward the first dotted line position shown in FIG. 1, a compression spring 132 disposed between the head and plate 110 and above the pivot pins 116 urges the plate to pivot in a clockwise direction (as viewed in FIGS. 1 and 5) and move the shelf to the dotted line position shown in FIG. 6, so that the openings 107 in the guide sleeves 106 are blocked.

A separate short bore 131 is collinearly disposed under each bore 104 and opens out the bottom edge of the head. A separate respective guide sleeve 133 is press fitted in each bore 131 and extends slightly below the lower edge of the head. Thus, when the shelf 118 is pivoted to the right (as viewed in FIGS. 1 and 5), each wire in each upper guide sleeve 106 is released to slide down through a respective lower or short guide sleeve 133 and into a respective vertical bore 134 in a carriage 136 moved intermittently under the movable head by a chain 138 powered through conventional means (not shown). Since the carriage does not form any part of the present invention per se, its construction is not described in detail.

To insure positive transfer of the wires or parts from the sleeves 106 and 133, vertical pusher pins 140 are mounted on a vertically movable pin block 142 and extend down through respective vertical sleeves 144 in a stationary pusher pin guide bar 146 disposed above the movable head. Each pusher pin 140 is collinear with a respective sleeve 106 when the movable head is in the second or solid line position shown in FIG. 1.

The pin block 142 is secured by a pair of forwardly extending ears 148 to rings 150 mounted to slide up and down a pair of vertical guide posts 152 secured to the top of table 10. The rear end of a longitudinally extending lever 154 includes a slot 156 which fits over a transverse horizontal roller 158 mounted between the ears 148. The lever 154 is secured near its center by a horizontal transverse pivot pin 160 in a bracket 162 attached to the table 10. A rotatable follower wheel 164 is mounted adjacent the forward end of the lever and rides on the upper end of a vertical push rod 166 which is moved up and down as described below either automatically from a cam arrangement (not shown) or by hand. A vertical tension spring 168 is attached at its upper end to the forward end of the lever 154 and is attached at its lower end to a block 170 so that the lever arm is urged to pivot in a counter-clockwise direction as viewed in FIG. 1.

In the operation of the apparatus, a loose batch of wires are stacked in each of the hopper sections so that the longitudinal axes of the wires extend in the same general direction as the dividers 42. The vibrator is turned on so that the vibrator plate 18 imparts a longitudinal shaking motion to the wires in the hopper divisions and causes the forward ends of the wires to be urged against the rear face of the elevator plate 43.

Figure 4:
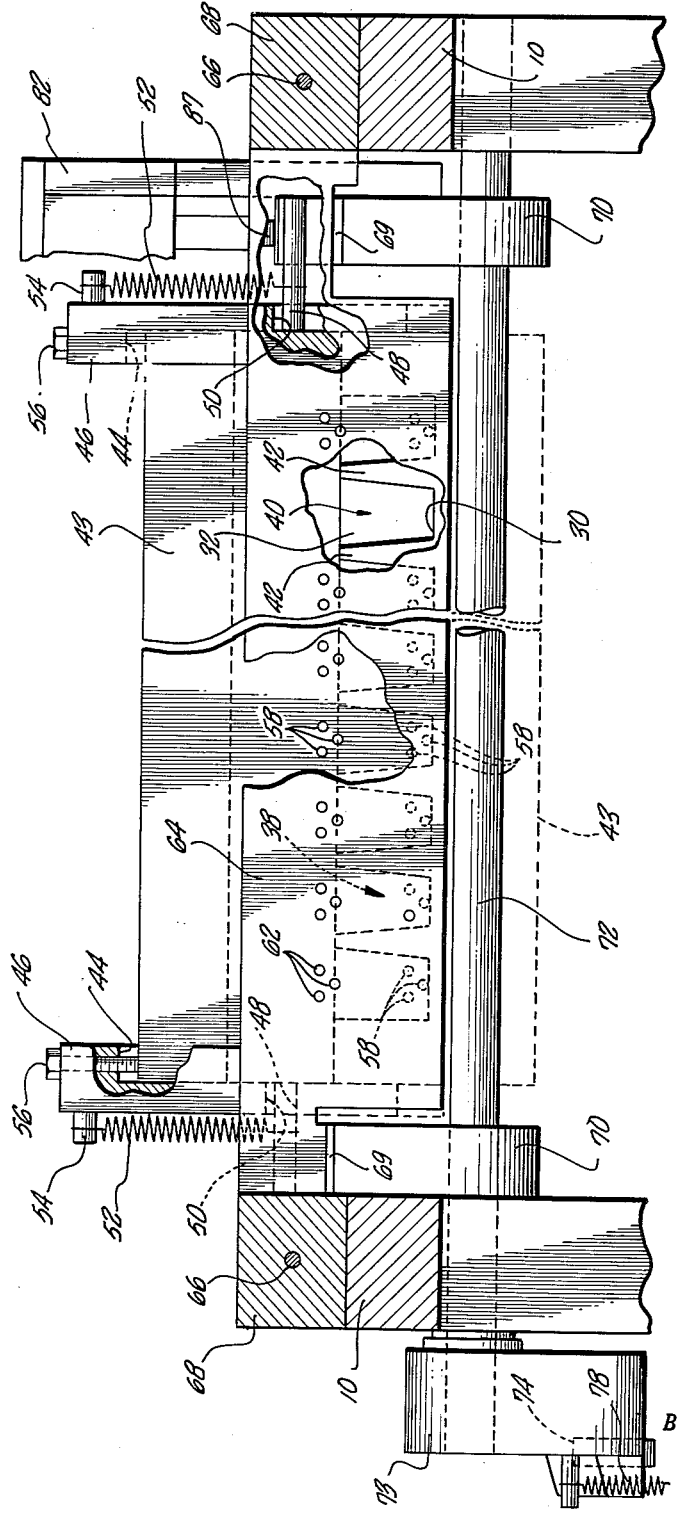
FIG. 4 is a view taken on line 4—4 of FIG. 1.

The push rod 76 is moved up from the position shown in FIG. 1, causing the shaft 72 to rotate counter-clockwise (as viewed in FIG. 1) and push leaf springs 69 down into contact with the elevator plate pins 48 so the elevator plate is forced down until the pins 48 strike the bottom of slots 50 in the elevator plate guides. The elevator plate is now in position so the stepped bores 58 in it are down to the dotted line positions shown in FIG. 4, i.e., the lowest holes in the series are at the hopper bottom. Preferably, the elevator plate is moved slightly (a distance about equal to the diameter of the bores 58) up and down two or three times in this position to facilitate the entry of wires into the holes. Experience has shown that this phase of the operation is adequate to insure that every hole in the elevator plate receives a forward end of a respective wire. Since the leaf springs 69 are flexible, the hopper continues to vibrate, even though they engage the elevator plate pins, and the wires are vibrated forward until they engage the back surface of the stationary plate 64. The increased section 60 of the stepped bores 58 in the elevator plate facilitates the entry of wires which are not perfectly straight, and the thickness of the elevator plate insures firm gripping of the wires in a cantilever fashion when the elevator plate is raised.

While the elevator plate is depressed to pick up wires, the movable head is swung up to the first or dotted line position shown in FIG. 1 by lowering push rod 96 until the head arm engages stop 99. The shelf on the stop plate 110 moves to the left to the dotted line position shown in FIG. 6 so that the lower ends of the sleeves 106 are blocked by the shelf.

The push rod 76 is lowered back into the position shown in FIG. 1 so that the upper edge of the elevator plate engages the stops 56 and the bores 58 are collinear with the bores 62 in the stationary plate. As the elevator plate moves upwardly, the forward ends of the selected wires in the bores 58 are gripped in a cantilever fashion and lifted up through the surrounding wires. The forward ends of the selected wires are continually urged by the vibration and slope of the bores against the rear face of the stationary plate 64 until the elevator plate reaches a loading position shown in FIG. 1, at which time the wires are free to slide through the bores in the stationary plate and into respective sleeves 106 in the head, which is now in the dotted line position shown in FIG. 1. The wires slide forward in the sleeves 106 until their forward end comes to rest against the shelf 118 on the stop plate 110.

Although not entirely critical, I have found that there is a preferred relationship between the diameter of the wires and the diameter of the holes opening out of the rear face of the elevator plate. In handling wires about 0.18 inch in diameter, it is preferred that the entrance hole in the elevator plate be about .030 inch, i.e., about 1.7 times the diameter of the selected part. In this way, the hole is large enough to admit freely the forward end of the selected part, yet is not so large that two parts can jam the hole. The increased bore portion of the hole in the elevator plate for the example just given is preferably about .034 inch. In this way, a wire which may not be perfectly straight easily passes through the plate, yet the wire is also prevented from cocking downwardly so much that it slips back out of the hole as the elevator plate lifts the selected wire through the surrounding wires in the hopper.

After the wires are slipped forward in the sleeves in the head, push rod 96 is moved up to the position shown in FIG. 1 so that the arms 92 are pivoted in a counter-clockwise direction (as viewed in FIG. 1) and return the head to the solid line position shown in FIGS. 1 and 5. As the head moves down to the solid line position, release pin 124 on the stop plate 110 engages inclined surface 126 and slides to the rear or right as viewed in FIGS. 1 and 5. This pivots stop plate 110 in a counter-clockwise direction about pivot pins 116, and slides the shelf 118 under the sleeves 106 to the solid line position shown in FIG. 6 so that the wires are free to slide down through the short sleeves 133 in the lower portion of the head, and into the carriage 136 for conveyance to a subsequent operation.

With the head in the solid line position shown in FIGS. 1 and 5 the pusher pins are moved down to insure downward transfer of the wires from the sleeves 106. This movement is accomplished by moving push rod 166 upwardly so that lever 154 pivots in a clockwise direction about pivot pin 160 and causes the pin block 142 to slide down guide posts 152. Thus, the pusher pins 140 insure the positive displacement of wires from the sleeves 106, even though the wires may not be perfectly straight, or otherwise tend to hang up on the interior of the sleeve. After the pusher pins displace the wires from the sleeves 106, the pin block is returned to the position shown in FIG. 1, and the foregoing cycle is ready to be repeated.

From the foregoing description, it will be appreciated that the apparatus of this invention simultaneously and automatically selects a large number of wires from a loose batch of wires, and moves the selected wires to a desired orientation in a minimum amount of time and without requiring skilled labor. In fact, all of the movements can be actuated from suitable cam mechanisms so that no operator is required.

I claim:

1. Apparatus for selecting an elongated part from a loose batch of such parts and orienting the selected part into a new position, the apparatus comprising means for holding a batch of the elongated parts disposed on their sides, means for moving a selected part longitudinally with respect to the other parts in the batch so that an end of the selected part protrudes from the batch, means for gripping the protruding end of the selected part and lifting it up through other parts in the batch to a loading position, a movable head having an elongated opening through it, means mounting the head adjacent the loading position to be pivotable between a first position with the opening collinear with the selected part and a second position with the opening disposed in a direction transverse to that in which it extends in the first position, and means for moving the selected part longitudinally into the opening when the head is in the first position.

2. Apparatus for selecting an elongated part from a loose batch of such parts and orienting the selected part into a new position, the apparatus comprising an elongated hopper for holding a loose batch of the elongated parts disposed on their sides, the hopper being closed at one end by a plate mounted to be movable in a generally up and down direction, the plate having an opening extending through it in the same general direction as the longitudinal axes of the parts in the hopper, means for moving the plate down to a lower position so the opening in it is near the bottom of the batch of parts, means for moving a selected part into the opening, means for lifting the plate to raise the selected part above the loose batch and to a loading position, a movable head having an elongated opening through it, means mounting the head adjacent the loading position to be pivotable between a first position with the head opening collinear with the selected part and a second position with the head opening disposed in a direction transverse to that in which it extends in the first position, and means for moving the selected part longitudinally from the plate opening into the head opening when the head is in the first position.

3. Apparatus according to claim 2 which includes a vibrator connected to the hopper to vibrate the parts toward the movable plate.

4. Apparatus according to claim 2 in which the plate opening diameter decreases in diameter in the direction extending into the hopper.

5. Apparatus according to claim 2 which includes stop means for limiting the travel of the selected part from the hopper into the plate opening.

6. Apparatus according to claim 5 which includes means for releasing the selected part from the stop means when the selected part reaches the loading position.

7. Apparatus according to claim 5 in which the stop means is a stationary plate mounted outside the hopper adjacent the movable plate, the stationary plate including an opening through it disposed to be collinear with the movable plate opening in the loading position.

8. Apparatus for selecting an elongated part from a loose batch of such parts and moving the selected part into a new position, the apparatus comprising an elongated hopper for holding a loose batch of the elongated parts disposed on their sides, the hopper being closed at one end by a plate mounted to be movable in a generally up and down direction between a lower and an upper position, the plate having an opening extending through it in the same general direction as the longitudinal axes of the parts in the hopper, the plate opening being disposed to be near the bottom of the batch when the plate is in the lower position and above the batch when the plate is in the upper position, first spring means connected to urge the plate to one of the positions, second spring means disposed adjacent the movable plate, and means for imparting a reciprocating movement to the second spring means and overcome the force of the first spring means and move the plate to the other position.

9. Apparatus according to claim 8 which includes a vibrator connected to the hopper.

10. Apparatus according to claim 8 which includes a microswitch connected to be actuated by overloading of the second spring means and generate an alarm signal.

11. Apparatus for selecting an elongated part from a loose batch of such parts and orienting the selected part into a new position, the apparatus comprising means for holding a loose batch of the elongated parts disposed on their sides, means for moving a selected one of the parts longitudinally with respect to the other parts in the batch so that an end of the selected part protrudes from the batch, means for gripping the protruding end of the selected part and lifting it up through the other parts in the batch to a loading position, a movable head having an elongated opening through it, means mounting the head adjacent the loading position to be pivotable between a first position with the opening collinear with the selected part and a second position with the opening disposed in a direction transverse to that in which it extends in the first position, means for moving the head to the first position, means for moving the selected part longitudinally into the head opening when the head is in the first position, means for moving the head with the selected part in the opening to the second position, a longitudinally movable elongated pusher pin mounted to be collinear with the head opening when the head is in the second position, and means for moving the pin into the opening when the head is in the second position to displace the selected part from the head opening.

12. Apparatus for selecting an elongated part from a loose batch of such parts and orienting the selected part into a new position, the apparatus comprising means for holding a loose batch of the elongated parts disposed on their sides, means for moving a selected one of the parts from the batch to a loading position, a movable head having an elongated opening through it, means mounting the head adjacent the loading position to be pivotable between a first position with the opening collinear with the selected part and a second position with the opening disposed in a direction transverse to that in which it extends in the first position, means for moving the selected part longitudinally into the opening when the head is in the first position, movable stop means on the head for limiting the travel of the selected part into the opening, a cam with a cam surface disposed adjacent the head in the second position, and a cam follower mounted on the stop means to engage the cam surface when the head is in the second position and move the stop means to release it.

13. Apparatus for selecting an elongated part from a loose batch of such parts and orienting the selected part into a new position, the apparatus comprising means for holding a loose batch of the elongated parts disposed on their sides, means for moving a selected one of the parts from the batch to a loading position, a movable head having an elongated opening through it, means mounting the head adjacent the loading position to be pivotable between a first position with the opening collinear with the selected part and a second position with the opening disposed in a direction transverse to that in which it extends in the first position, means for moving the selected part longitudinally into the opening when the head is in the first position, movable stop means on the head for limiting the travel of the selected part into the opening, a cam with a cam surface adjacent the head in the second position, a cam follower on the stop means to engage the cam surface when the head is in the second position and move the stop means to release it, and spring means mounted to resist the movement of the stop means by the cam follower.

References Cited in the file of this patent

UNITED STATES PATENTS

| | | |
|---|---|---|
| 1,280,585 | Taylor | Oct. 1, 1918 |
| 1,882,168 | Valas | Oct. 11, 1932 |
| 2,070,139 | Metzgus | Feb. 9, 1937 |
| 2,108,280 | Wright | Feb. 15, 1938 |
| 2,252,561 | Engel | Aug. 12, 1941 |
| 2,486,461 | Bousquet | Nov. 1, 1949 |
| 2,599,939 | Richardson | June 10, 1952 |
| 2,635,261 | Stewart et al. | Apr. 21, 1953 |
| 2,997,202 | Madeux | Aug. 22, 1961 |
| 3,008,565 | Small | Nov. 14, 1961 |

FOREIGN PATENTS

| | | |
|---|---|---|
| 131,975 | Germany | July 7, 1902 |